July 24, 1934.  C. SCHOUTE  1,967,541
BALLOON THEODOLITE
Filed March 19, 1932  3 Sheets-Sheet 1
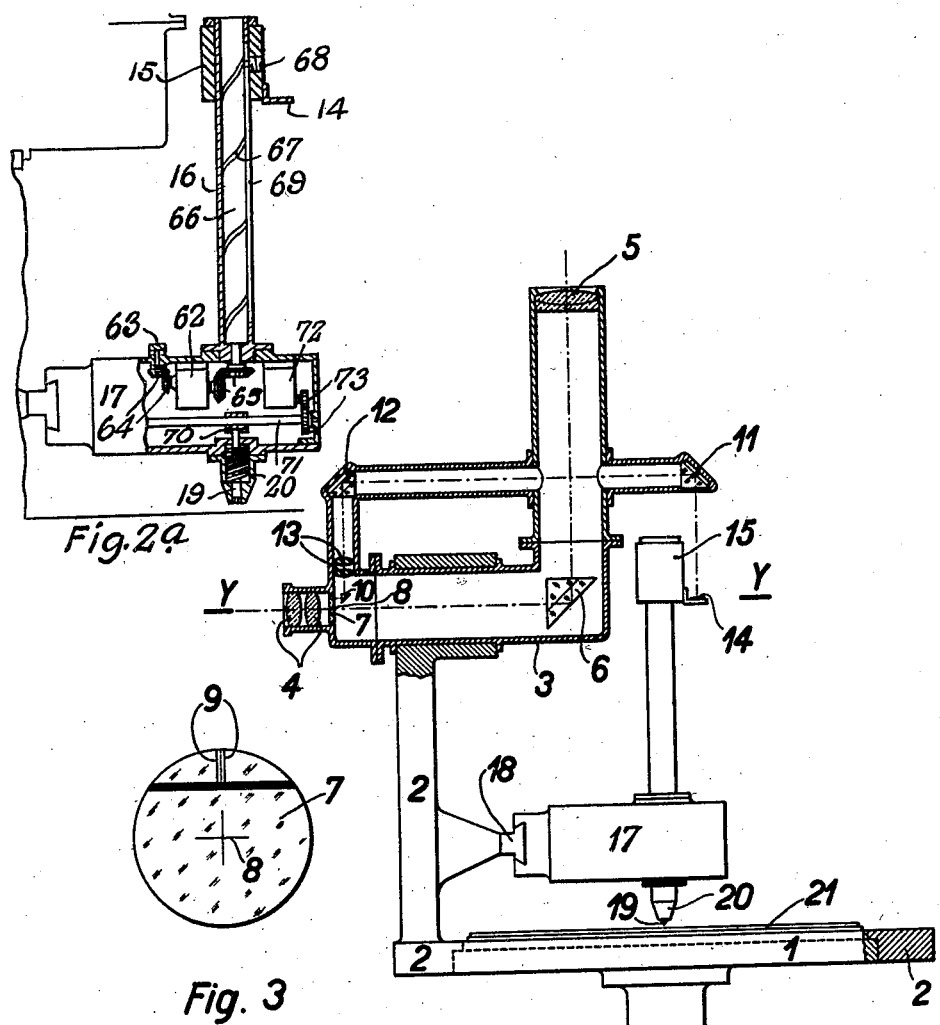
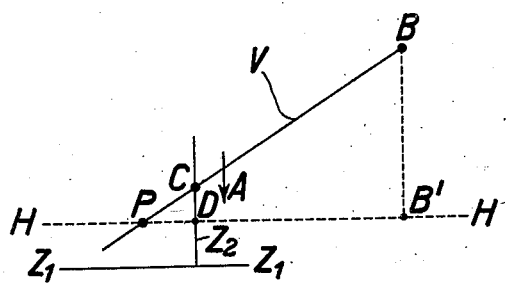
Inventor:
Cornelius Schoute.

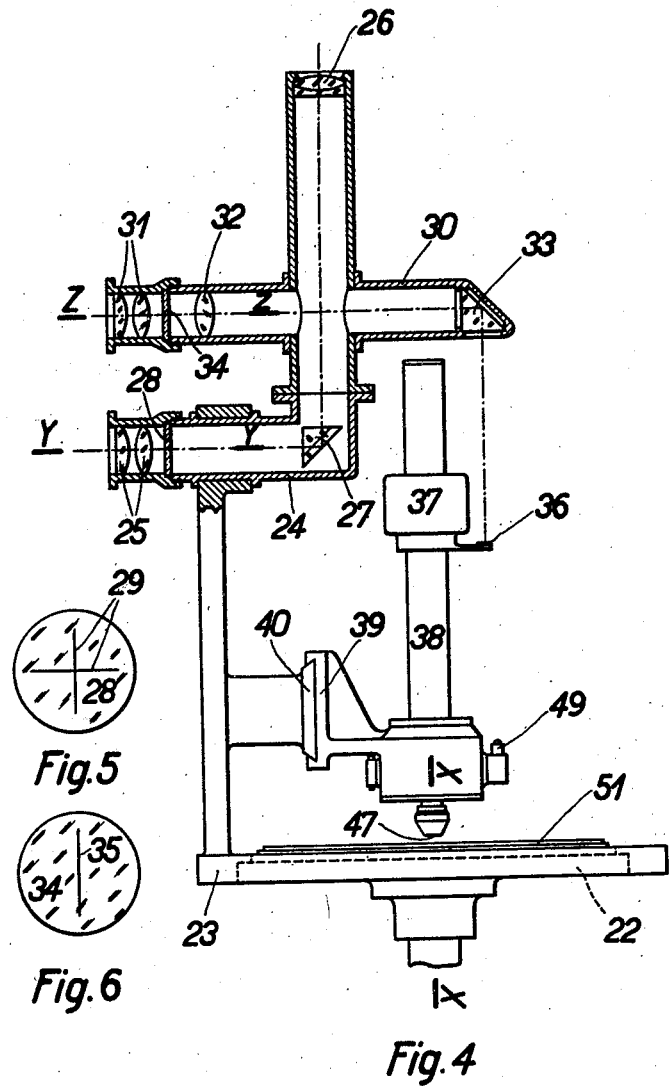

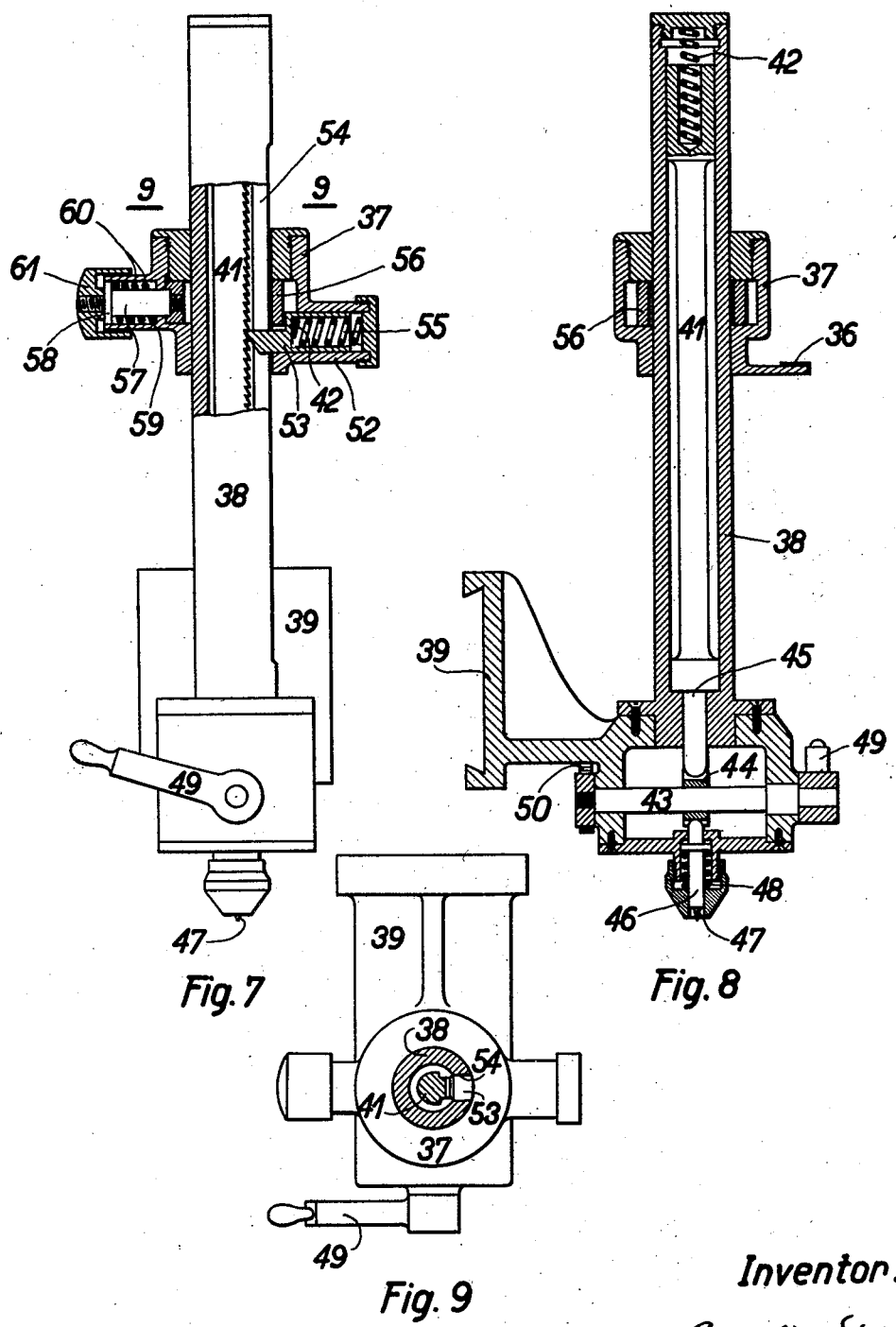

Patented July 24, 1934

1,967,541

UNITED STATES PATENT OFFICE 1,967,541

BALLOON THEODOLITE

Cornelius Schoute, De Bilt, near Utrecht, Netherlands, assignor to the firm of Carl Zeiss, Jena, Germany Application March 19, 1932, Serial No. 600,047
In Germany March 23, 1931

2 Claims. (Cl. 33—20)

I have filed applications in Germany, March 23, 1931, and July 13, 1931.

The invention concerns a balloon theodolite having a plotting device the object of which is to trace on a reduced scale, eventually by means of a dotting device working at uniform intervals of time, the vertical projection of the course of a sounding balloon. The balloon theodolite is also provided with a control member movable according to the course of the sounding balloon and so coupled to the plotting device that it partakes of the reciprocal movements of plotting pencil and plotting surface and is adjustable at right angles to the drawing surface. A drive, eventually connected to a clock-work or a similar appliance, alters the distance of the control member from the plotting surface, this alteration being effected either continuously according to the ascending speed of the sounding balloon or gradually according to the differences in the ascending heights of the sounding balloon in a unit of time.

While balloon theodolites of this kind have been so constructed that the said control member is mechanically coupled to the universally rotatable viewing telescope, the invention aims at dispensing with any such mechanical coupling. The invention provides the control member with a mark and connects to the viewing telescope an optical system for observing the said mark. This novel construction offers the advantage that intermediate gearings, which have to be manufactured with greatest precision, are avoided, the whole instrument thus being simplified and the cost of its manufacture considerably reduced. In spite of this advantage, the manipulation of the new instrument hardly presents more difficulties than that of the balloon theodolites known so far.

The movement of the control member and its mark, which corresponds to the movements of the sounding balloon, is effected for instance by imaging the mark in the image plane of the viewing telescope by means of the said optical system and by keeping the images of this mark and the sounding balloon in coincidence according to the known method in which two images are made to overlap (special sighting marks in the viewing telescope thus being dispensed with). Another method would be to dispose in two different parts of the image plane of the viewing telescope two sighting marks for directing the viewing telescope to the sounding balloon and for adjusting the control member and this mark relatively to the said optical system, respectively. When constructing the driving device for varying the distance of the control member from the plotting surface in such a manner that this distance is altered gradually, the optical system for imaging the mark of the control member may be given a special ocular lying near that of the telescope, so that one and the same observer can alternatively look through both oculars without the necessity of moving his head to a great extent.

In the following description of the measuring process with a balloon theodolite, reference is had to Figure 1 of the accompanying drawings.

Figure 2 illustrates in elevation, partly in a section and partly in a view, an example of a balloon theodolite according to the invention. Figure 2a is a view partly in section and on an enlarged scale, of a portion of Figure 2. Figure 3 shows the view of the reticule of the sighting telescope.

Figure 4 illustrates another example in elevation, partly in a section and partly in a view. Figures 5 and 6 represent in a view the reticules of the telescope and of the microscope of the instrument. Figures 7, 8 and 9 show part of the instrument on an enlarged scale.

In Figure 1, P is the centre of rotation about which a sighting line V to be directed to a sounding balloon B is universally rotatable. B' is the foot point of the perpendicular dropped from B to a horizontal plane H—H going through P. $Z_1$—$Z_1$ is the horizontal plotting plane of a balloon theodolite. C is a control member which is displaceable in any direction parallel to the plotting plane $Z_1$—$Z_1$ and is adjustable perpendicularly to the plotting plane in the direction of A. The foot point of the perpendicular dropped from C to the horizontal plane H—H is denominated D. The control member C is to be assumed to be coupled to the plotting pencil $Z_2$ in such a manner that this plotting pencil $Z_2$ is always vertically below C and connected, mechanically or optically, to the sighting line V in such a way that it always lies in this line. The control member C is to be assumed to be so actuated by means of a clock-work that it has in the direction A a uniform speed which, relatively to the reduced scale on which the tracing of the diagram projection of the course of the sounding balloon is to be based, corresponds to the uniform ascending speed of the sounding balloon B adhering to the known law. Assuming that the sighting line V is always kept directed upon the sounding balloon B, the triangles PCD and PBB' are always similar to each other, and the plotting pencil $Z_2$ traces on the desired scale on the plotting surface $Z_1$—$Z_1$ the diagram projection of the course of the sounding balloon B.

The balloon theodolite according to Figure 2 has a table 1, which is to be assumed to be mounted on a tripod or the like for rotation about a vertical axis X—X and which is fixable relatively to its support. A body 2 is rotatably so disposed on this table 1 that its axis of revolution coincides with the axis of revolution X—X. A sighting telescope 3 is mounted in an arm of this body in such a manner that it is rotatable about an axis Y—Y intersecting at right angles the axis X—X. The telescope 3 contains an ocular 4 the optical axis of which coincides with the axis of revolution Y—Y, an objective 5, a roof prism 6 deviating the viewing axis by 90° and a reticule 7. This reticule has cross lines 8 the point of intersection of which lies in the ocular axis, and in its upper part a double line 9 which is parallel and symmetrical to the longitudinal line of the said cross lines. Near the double line 9 is provided a small single reflecting prism 10 which, in conjunction with a single reflecting prism 11, a roof prism 12 and a lens system 13, images in the image plane of the ocular 4 a mark 14 parallel to the axis Y—Y. The mark 14 is fixed to a slide 15 which is displaceable along a tubular body 16 parallel to the axis of rotation X—X and fixed to a housing 17. For uniformly moving the slide 15 along the tubular body 16, a clock-work 62 is provided in the housing 17. By means of a milled head 63 and a pair of bevel wheels 64 the clock-work 62 may be given different speeds. Through the agency of a pair of bevel wheels 65 this clock-work drives a shaft 66 rotatably mounted in the tubular body 16 and having a helical groove 67 into which extends a pin 68 fast with the slide 15, this pin 68 fitting tightly into and going through a longitudinal groove 69 in the body 16. The housing 17 is so mounted on a guide 18 fixed to the arm of the body 2 as to be displaceable in a direction at right angles to the plane determined by the axes of rotation X—X and Y—Y. In the housing 17 a dotting pencil 19 is so disposed as to be displaceable parallel to the axis of rotation X—X, the point of the dotting pencil lying in a plane containing the axis of rotation X—X, regardless of the position of the housing 17. When the point of the dotting pencil 19 coincides with this axis X—X the mark 14 lies in a vertical plane going through the axis of rotation Y—Y. By means of a spring 20, the dotting pencil 19 is kept in contact with a cam disc 70 fast with a shaft 71 rotatably mounted in the housing 17. The shaft 71 is rotated uniformly by a clock-work 72 provided in the housing 17 and coupled to this shaft by means of a pair of wheels 73. By uniformly rotating the cam disc 70, the clock-work 72 causes the dotting pencil 19 to make at equal intervals of time dots on a drawing sheet 21 fixed to the table 1.

Before releasing from the place of the theodolite the sounding balloon which is to be followed by the sighting telescope of the instrument, the device is to be adjusted in the following manner. The housing 17 is to assume that position at which the point of the dotting pencil 19 coincides with the axis of rotation X—X, and the slide 15 must be raised as much as possible. The mark 14 then coincides with the axis of rotation Y—Y. Moreover, the telescope 3 must assume such a position in its bearing on the arm of the body 2 that, when looking into the ocular 4, the image of the mark 14 is seen in the double line 9, the axis of the objective 5 then being parallel to the axis of revolution X—X. At the moment at which the balloon begins to ascend, the clock-works 62 and 72 in the housing 17 are to be set going, the clock-work 62 having been previously so adjusted by means of the milled head 63 that to the slide 15 is imparted a downward movement along the tubular body 16 and that the speed of this movement is proportional to the ascending speed of the sounding balloon, which depends upon the ascending force of the balloon. In this case the only thing necessary is to maintain the sighting telescope 3 directed upon the balloon by turning the body 2 relatively to the fixed table 1 about the axis X—X and the telescope about the axis Y—Y and to displace the housing 17 in the guide 18 in such a manner that the double line 9 is seen in coincidence with the simultaneously viewed image of the mark 14. The dotting pencil 19 pressed down at equal intervals of time then indicates on the drawing sheet 21 the horizontal projection of the course of the balloon, by means of which the speed of the wind in the different heights can be found at once, since each dot made by the dotting pencil corresponds to a definite height.

The device according to Figure 4 has a table 22 which is to be assumed to be mounted on a tripod or the like. This table 22 is rotatable about a vertical axis X—X and can be fixed with respect to its support. A body 23 is rotatably so provided on the table 22 that its axis of revolution coincides with the axis of revolution X—X. On an arm of this body 23, a sighting telescope 24 is mounted for rotation about an axis Y—Y which perpendicularly intersects the axis X—X. The telescope 24 contains an ocular 25 the optical axis of which coincides with the axis of revolution Y—Y, an objective 26, a roof prism 27 deviating the viewing axis of 90°, and a reticule 28 on which cross lines 29 (Figure 5) are so provided that their point of intersection lies in the axis of the ocular 25. 30 designates a microscope containing an ocular 31, an objective 32, a single reflecting prism 33, and a reticule 34 with a longitudinal line 35 (Figure 6) intersecting the optical axis Z—Z of the ocular 31 and being parallel to the optical axis of the objective 26. The microscope 30 is so fixed to the telescope 24 that, when the optical axis of the objective 26 of the telescope 24 is in vertical position, the optical axis Z—Z of the ocular 31 of the microscope 30 is vertically above the axis Y—Y.

The object of the microscope 30 is to image in the image plane of the ocular 31 a reticule 36 parallel to the axis Y—Y. This mark 36 is fixed to a housing 37 which is displaceable along a tubular body 38. This tubular body 38 is fixed to a slide 39, which is displaceable in a guide 40 of the arm of the body 23 perpendicularly to the plane determined by the axes of revolution X—X and Y—Y, in such a manner that its tube axis is parallel to the axis of revolution X—X and lies in that plane which contains this axis of revolution and is parallel to the direction of displacement of the slide 39. In the tubular body 38 (Figures 7 and 8) a rack 41 is so mounted that it can be displaced in the direction of the tube axis. By means of a spring 42 a tooth 53 is pressed against the rack 41, as a consequence of which the pressure component acting in downward direction makes the rack 41 assume its lower position. A shaft 43 provided with a cam disc 44 and parallel to the axis of revolution Y—Y is fixed to the slide 39. The cam disc 44 is opposite a bolt 45 which is fixed to the rack 41 and whose axis is parallel to the direction of displacement of this rack 41. The cam disc 44 is in contact with a dotting pencil 46 disposed in the slide 39 and displaceable in the same direction as the rack 41. The dotting pencil 46, which can be so displaced that its point 47 lies in the plane containing the axis of revolution X—X and being parallel to the direction of displacement of the slide 39, is continuously kept in touch with the cam disc 44 by means of a spring 48. The cam disc 44 is so constructed that a rotation of the shaft 43, which is to be effected by pressing the hand lever 49 against the action of a spring 50, causes the rack 41 to be lifted by one tooth, the consequence being that the dotting pencil 46 is moved downward to such an extent that it makes a dot on the drawing sheet 51 fixed to the table 22.

In a tubular piece 52 fixed to the housing 37 a tooth 53 meshing with the rack 41 is displaceably mounted in such a manner that its direction of displacement is perpendicular to the division plane of the rack 41. The tooth 53 fits tightly into and goes through a longitudinal slot 54 in the tubular body 38, thus preventing the housing 37 from being turned relatively to the tubular body 38. A spring 55 keeps the tooth 53 in mesh with the rack 41. In the housing 37 an annular body 56 is so provided that it loosely goes round the tubular body 38 and lies with its two faces against corresponding surfaces of the housing 37. With a view to be in a position to displace the annular body 56 in the direction of displacement of the tooth 53 relative to the housing 37, the annular body 56 contains a horizontal bolt 57 which is guided by means of a bush 58 into a tubular piece 59 connected to the housing 37 and whose axis is parallel to that of the piece 52. The bolt 57 is surrounded by a spring 60 which rests against the housing 37 and the bush 58. The purpose of this spring 60 is to continuously press the annular body 56 against the tubular body 38, so that, owing to the friction existing between these two bodies, the bush 58 maintains its height adjustment relative to the tubular body 38. By pressing against a cap 61 screwed to the bolt 57, the annular body 56 can be displaced against the action of the spring 60, the consequence being that the said friction is discontinued. During this displacement, the annular body 56 presses against a piece 42 of the tooth 53 and displaces this tooth against the action of the spring 55, which, in addition to the said discontinuation of the friction, disengages the tooth 53 from the rack 41, so that the housing 37 can be freely displaced along the tubular body 38.

Before the sounding balloon to be followed by the sighting telescope 24 is released from the place of the device, the following adjustments are to be made. The slide 39 has to be made to assume that position in the guide 40 at which the point 47 of the dotting pencil 46 coincides with the axis of rotation X—X and the housing 37 assumes that position on the tubular body 38 (the upper end position) at which the reticule 36 coincides with the axis of revolution Y—Y. Further, a clock-work ringing at regular intervals of time (not represented in the drawing) which is to be used in conjunction with the device is to be set going. The length of the period of time between two ringings must be such that during this period the ascending height depending upon the ascension force of the sounding balloon corresponds to the interstice between two teeth of the rack 41.

These adjustments having been effected, the sounding balloon is to be released at the moment of a ringing of the bell. The hand lever 49 is to be pressed down quickly. This causes the dotting pencil 46 to mark on the drawing sheet 51 that point which corresponds to the horizontal projection of the starting point of the sounding balloon and the rack 41 to be lifted by one tooth. When moving upward, the rack 41 presses the tooth 53 to the side against the action of the spring 55 until this tooth is opposite the next rack tooth below with which the spring 55 causes it to mesh. When the hand lever 49 is released and is caused by the spring 50 to assume its former position, the rack 41 is again pressed down by the spring 42 and, owing to the reestablished mesh of the tooth 53 and the rack 41, it causes the housing 37 and, consequently, also the reticule 36 to be lowered by one tooth height. The reticule 36 is thus given that height relative to the tubular body 38 which corresponds to the horizontal plane in which the balloon is at the moment of the next ringing of the bell. Now the telescope 24 is to be so kept directed upon the balloon by turning it about the axes X—X and Y—Y that the image of the balloon is continuously in the reticule 29 of the telescope. At the moment of the next ringing of the bell the following of the balloon is to be discontinued and the slide 39 to be displaced so far in the guide 40 until in the microscope 30 the image of the reticule 36 is seen to coincide with the longitudinal line 35 of this microscope. At this moment the lever 49 is again to be pressed down quickly. The consequences are the same as described above. Following the balloon until the bell rings another time, adjusting the slide 39 by means of the microscope 30 and pressing down the hand lever 49 at the moment of the next ringing of the bell now repeat each other.

Since each dot corresponds to a definite height of the sounding balloon, the directions of the speed of the wind in the different height regions are found at once by means of the lines drawn through the dots marked on the drawing sheet 51.

I claim:

1. A balloon theodolite comprising a sighting telescope, a plotting device, consisting of a plotting pencil and a drawing surface, a guide means at right angles to the drawing surface and means guiding the first means to move parallel to the drawing surface, a control member displaceable along this guide means at right angles to the drawing surface, a drive for moving the control member along the guide, means for coupling the guide to the plotting device so that the two move in unison over the plotting surface, a mark provided on the control member, and an optical system for viewing this mark, the said optical system being connected to the sighting telescope.

2. A balloon theodolite comprising a sighting telescope, a plotting device, consisting of a plotting pencil and a drawing surface, a guide means at right angles to the drawing surface and means guiding the first means to move parallel to the drawing surface, a control member displaceable along this guide, means at right angles to the drawing surface, a drive for automatically moving the control member along the guide, means for coupling the guide to the plotting device so that the two move in unison over the plotting surface, a mark provided on the control member, an optical system connected to the sighting telescope, this optical system comprising means for imaging the said mark in the image plane of the telescope, and two sighting marks at different places in the field of view, the one of these sighting marks being so disposed as to direct the telescope to the balloon, and the other of these sighting marks being disposed in such a manner that, by adjusting the said guide, the image of the mark of the control member is made to coincide with the said other sighting mark.

CORNELIUS SCHOUTE.